March 22, 1938. J. H. PERCIVAL 2,111,988
AEROPLANE
Filed March 3, 1936 2 Sheets-Sheet 1
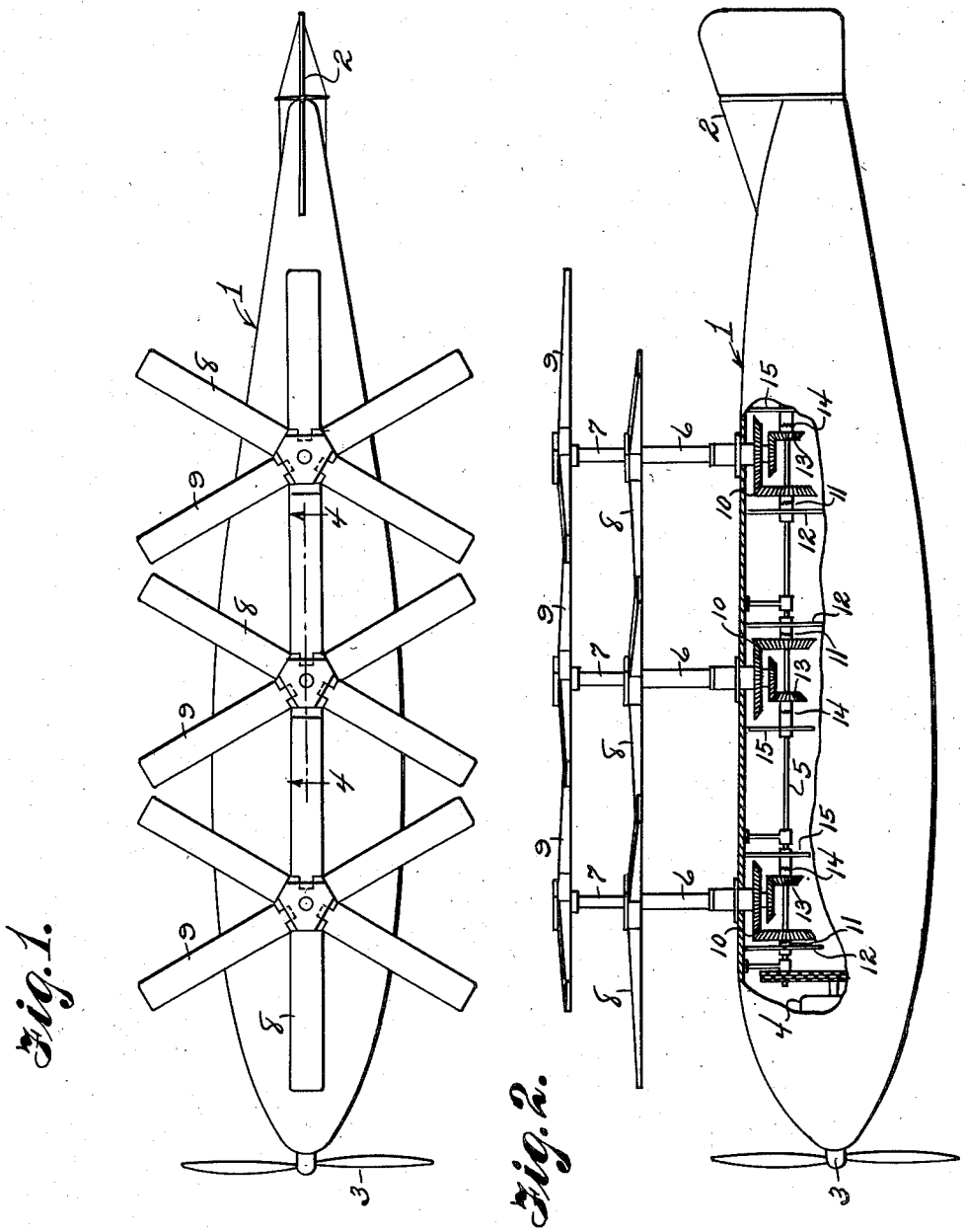
John H. Percival
INVENTOR
BY Victor J. Evans & Co.
ATTORNEY March 22, 1938.  J. H. PERCIVAL  2,111,988
AEROPLANE
Filed March 3, 1936   2 Sheets-Sheet 2
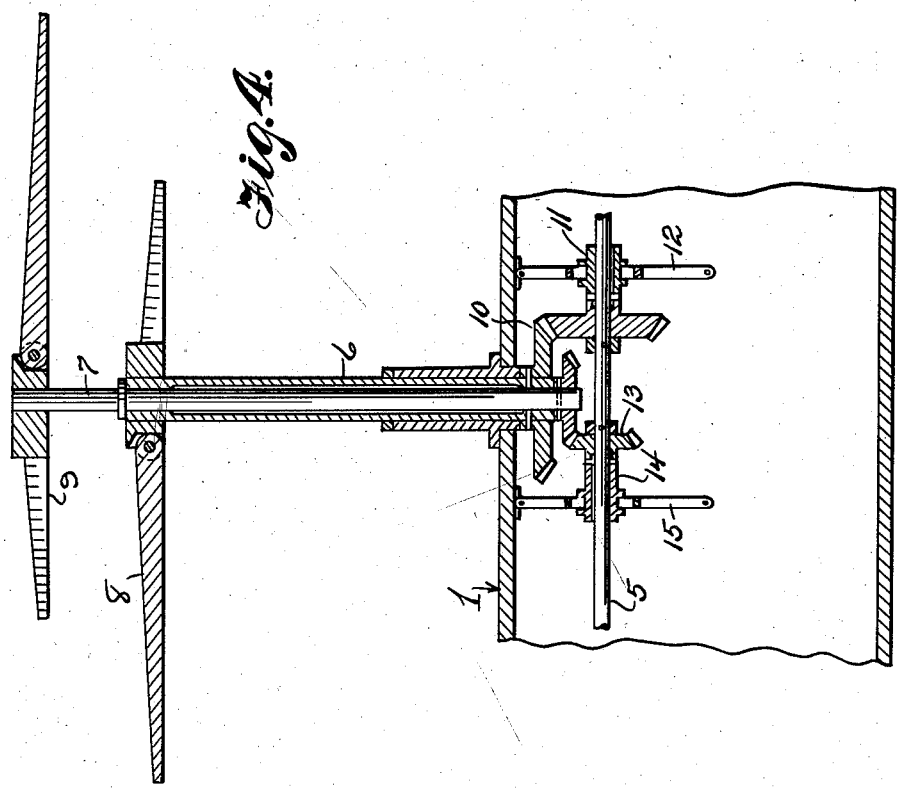
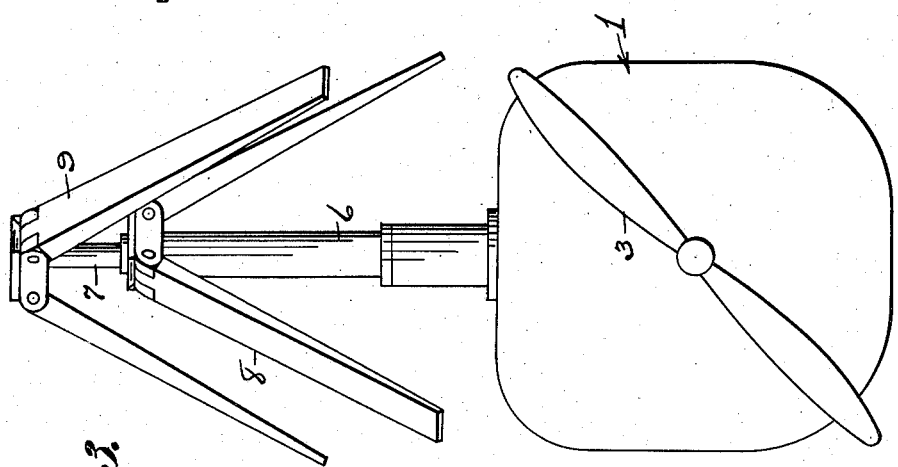
John H. Percival
INVENTOR
BY Victor J. Evans & Co.
ATTORNEY Patented Mar. 22, 1938

2,111,988

UNITED STATES PATENT OFFICE 2,111,988

AEROPLANE

John H. Percival, De Kalb, Mo.

Application March 3, 1936, Serial No. 66,923

3 Claims. (Cl. 244—17)

This invention relates to airships of the helicopter type and has for the primary object the provision of a device of this character wherein the flight thereof will be sustained by a series of lifting propellers driven from a common power source and each having a control whereby any one of the sustaining propellers may be rendered operative or inoperative and thereby provide means whereby the airship may be made to ascend and descend vertically or sustain a horizontal flight when desired.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating an airship constructed in accordance with my invention.

Figure 2 is a side elevation, partly in section, illustrating the same.

Figure 3 is a front elevation illustrating the device.

Figure 4 is a fragmentary sectional view taken on the line 4—4 of Figure 1.

Referring in detail to the drawings, the numeral 1 indicates the body or fuselage of the device, the tail end of which is equipped with the conventional type of steering and elevating mechanism 2. A propeller 3 is located at the front end of the body and is driven by an engine 4, the latter also drives a shaft 5 suitably journaled in the body and arranged horizontally. Shafts 6 are journaled to the body and arranged vertically and have extending therethrough shafts 7 of greater length. The shafts 7 are rotatably supported by the shafts 6. The shafts are arranged in longitudinal alignment. The shafts 6 have secured thereto sustaining propellers 8 and the shafts 7 have secured thereto sustaining propellers 9. Due to the arrangement of the shafts 6 and 7 the sustaining propellers 8 and 9 will be grouped in pairs with the propellers of each pair arranged in superimposed relation. Each propeller includes a hub to which the blades are hinged. The hinging of the blades to the hubs of said propellers permits said blades to depend when in non-rotation and to assume horizontal position when in rotation.

Each shaft 6 is connected to the shaft 5 by gearing 10 including a clutch 11 controlled by a lever 12 for connecting and disconnecting the shaft 7 to the shaft 5. Each shaft 7 is geared to the shaft 5 by a gearing 13 including a clutch 14 controlled by a lever 15 whereby the shaft 7 may be connected and disconnected to the shaft 5. The gearing mechanisms 13 rotate the shafts 7 at a greater rate of speed than the shafts 6 consequently the sustaining propellers 9 rotate faster than the sustaining propellers 8. Also the sustaining propellers 8 rotate in an opposite direction to the sustaining propellers 9.

An airship sustained in flight by propellers constructed and driven as described will permit the airship to readily ascend and descend vertically and to maintain normal flight forwardly when desired.

Having described the invention, I claim:

1. An airship comprising a body, steering and elevating means for said body, a power means carried by said body, sustaining propellers carried by said body and arranged in a plane above the latter and grouped in pairs with the propellers of each pair arranged in superimposed relation, and a pair of clutches for each pair of propellers operable for separately connecting the propellers to the power source whereby to vary the course of said airship.

2. An airship comprising a body, steering and elevating mechanisms for said body, a power source supported by the body, pairs of vertically arranged shafts journaled to said body, and the shafts of each pair arranged in telescopic relation, sustaining propellers secured to said shafts and grouped in pairs with the propellers of each pair arranged in superimposed relation, gearing means for said shafts, a drive shaft journaled in said body, a pair of clutches for each pair of propellers operable for separately connecting the gearing mechanisms to the drive shaft whereby to vary the course of said airship, and means connecting the drive shaft to the power source.

3. An airship comprising a body, steering and elevating mechanisms for said body, a power source supported by the body, pairs of vertically arranged shafts journaled to said body and the shafts of each pair arranged in telescopic relation, sustaining propellers secured to said shafts and grouped in pairs with the propellers of each pair arranged in superimposed relation, gearing mechanisms for said shafts, a drive shaft journaled in said body, a pair of clutches for each pair of propellers operable for separately connecting the gearing mechanisms to the drive shaft whereby to vary the course of said airship, means connecting the drive shaft to the power source, each propeller including hingedly mounted blades capable of occupying depending positions during non-rotation of said propellers and to assume horizontal position during rotation.

JOHN H. PERCIVAL.